United States Patent [19]
Takahashi et al.

[11] Patent Number: 5,882,708
[45] Date of Patent: Mar. 16, 1999

[54] MILK-CONSTITUENT-CONTAINING BEVERAGE

[75] Inventors: Akihiko Takahashi, Hirakata; Fumiko Yoshida, Suita; Hisashi Murakami, Neragawa, all of Japan

[73] Assignee: Riken Vitamin Co., Ltd., Tokyo, Japan

[21] Appl. No.: 956,042

[22] Filed: Oct. 24, 1997

[30] Foreign Application Priority Data

Dec. 11, 1996 [JP] Japan ................................. 8-351899

[51] Int. Cl.$^6$ .............................. A23L 2/44; A23C 15/18
[52] U.S. Cl. ...................... 426/330.3; 426/580; 426/590; 426/594; 426/602; 426/604; 426/611
[58] Field of Search .................................. 426/602, 604, 426/611, 580, 594, 590, 330.3

[56] References Cited

FOREIGN PATENT DOCUMENTS 60-083885  4/1985  Japan .
61-242567  10/1986  Japan .

*Primary Examiner*—Helen Pratt
*Attorney, Agent, or Firm*—Roylance,Abrams,Berdo & Goodman, L.L.P.

[57] ABSTRACT

The present invention is relating to milk-constituent-containing beverages which are preserved and distributed in metal cans, and characterized that a milk-constituent-containing beverage, which is provided with growth inhibition effects against heat-resistant spore-forming bacteria and in which such problems as coagulation, oiling off, feathering, precipitation, neck ring, etc. of the milk constituents are suppressed, said milk-constituent-containing beverage containing (A) diglycerol monoesters of fatty acids and (B) at least one emulsifier such as citric acid esters of mono- and diglycerides of fatty acids, guccinic acid esters of mono- and diglycerides of fatty acids, diacetyltartaric acid esters of mono- and diglycerides of fatty acids, polyglycerin monoesters of fatty acids with an HLB of 3 to 16, and sucrose esters of fatty acids with an HLB of 3 to 16, said beverage being characterized in that 70 wt. % or more of the fatty acid composition of the diglycerol monoesters of fatty acids is taken up by the total amount of myristic acid and/or palmitic acid and in that the monoester content of the ester compositioin of the diglycerin fatty acid monoester is 70 wt. % or more.

16 Claims, No Drawings

MILK-CONSTITUENT-CONTAINING BEVERAGE

BACKGROUND OF THE INVENTION

1. Field of the Invention

The present invention concerns coffee, tea, cocoa, and other beverages containing milk constituents, and particularly concerns stabilized milk-constituent-containing beverages in which the germination of spores of and proliferation of heat-resistant spore-forming bacteria are inhibited and in which problems such as coagulation, oiling off, feathering, precipitation, neck ring, etc. of the milk constituents contained are suppressed.

The present invention applies to milk-constituent-containing beverages which are preserved and distributed in metal cans, such as aluminum cans, steel cans, etc., bottles, such as glass, ceramic, etc., and various other containers made of paper, synthetic resin, etc.

2. Description of the Prior Arts

Many beverages such as coffee, tea, cocoa, etc. contain milk constituents to improve flavor generally used, and taste, etc. The milk constituents used vary widely in type and amount, and include raw milk, raw cream, whole milk powder, skim milk powder, or instant creaming powder (ICP).

When stored over long periods of time, beverages containing milk constituents undergo loss of potable aptitude (marketability) due to such problems as separation, oiling off, feathering, precipitation, neck ring, etc. of the milk constituents. Also, although milk-constituent-containing beverages are usually sterilized by retorting, there are cases where the spores of heat-resistant spore-forming bacteria survive under the conditions of such treatment. In cases where milk-constituent-containing beverages are sold or stored under low-temperature storage conditions in a vending machine, etc., there is little possibility of germination of spores of and proliferation of the surviving heat-resistant spore-forming bacteria and quality problems do not occur. However, if such beverages are placed in a heated condition, for example at 55° C., the surviving spores of heat-resistant spore-forming bacteria can germinate and proliferate to cause the beverage contents to deteriorate and the beverage to thus lose potable aptitude (marketability).

The combined use of a polyglycerin monoesters of fatty acids, comprising lauric acid and myristic acid, and mono- and diglycerides of fatty acids (laid-open Japanese patent publication No. Hei6-121640), the combined use of sucrose esters of fatty acids and citric acid esters of mono-and diglycerides of fatty acids (laid-open Japanese patent publication No. Hei5-15349), etc. have been proposed as methods of preventing deterioration and putrefaction of the beverage contents through prevention of germination of spores of and proliferation heat-resistant spore-forming bacteria and preventing undesirable effects due to physicochemical changes at the same time. However, with the former of the above methods, not only does the lauric acid, which is a lower fatty acid, damage the flavor significantly but the antibacterial effects are also inadequate. With the latter method, since sucrose esters of fatty acids is used, the effects of preventing the germination of spores of and proliferation of heat-resistant spore-forming bacteria are inadequate and unsatisfactory.

The present inventors have previously proposed the milk-constituent-containing beverage disclosed in Japanese patent application No. Hei7-144075 (laid-open Japanese patent application No. Hei8-228676). This prior art discloses a milk-constituent-containing beverage that uses diglycerol monoesters of fatty acids as emulsifier and is characterized in that 70 wt. % or more of the fatty acid composition of the diglycerol monoesters of fatty acids is taken up by the total amount of myristic acid and/or palmitic acid. With this prior art, the germination of spores of and proliferation of heat-resistant spore-forming bacteria can be suppressed even when the beverage is stored at a high temperature over long periods.

SUMMARY OF THE INVENTION

With regard to the above mentioned prior arts, the present inventors proposed that mono-and diglycerides of fatty acids, lecithin, or other known emulsifier may be used in combination. The present inventors continued further research on this prior art. As a result, we were able to make the surprising discovery that, by selecting and making combined use of specific emulsifiers among known emulsifiers, not only can heat-resistant spore-forming bacteria growth inhibition effects be provided but the coagulation, oiling off, feathering, precipitation, and neck ring of the milk constituents can also be suppressed.

As is clear from the above, the object of the present invention is to provide a milk-constituent-containing beverage for which the germination of spores of and proliferation heat-resistant spore-forming bacteria are suppressed and for which physicochemical changes of the beverage contents are prevented over long periods, even though the beverage may be a milk-constituent-beverage for which the death rate of the spores of heat-resistant spore-forming bacteria surviving in the beverage is improved without raising the sterilization temperature conditions or a milk-constituent-containing beverage which is stored over long periods under high-temperature conditions.

In the invention, "feathering" means that feather-like coagulation arises when cream is added to coffee.

Furthermore, "oiling off" means that oil drops are joined together to become large, whereby oil is separated from the base material.

Still furthermore, "neck ring" means that white rings are formed, the main constituents of which are fat and protein.

DETAILED DESCRIPTION OF THE PREFERRED EMBODIMENT

The present invention shall now be described in detail.

First, the abovementioned component (A) used in the present invention shall be described.

The diglycerol monoesters of fatty acids used in the present invention can be obtained by preparing an ester mixture through esterification of diglycerol monoesters of fatty acids and fatty acids, transesterification of diglycerol monoesters of fatty acids and fatty acids and methyl esters of fatty acids or other esters, esterification of glycerol by fatty acid halides, etc. and then performing separation and purification by a method such as distillation fractionation, adsorption chromatography separation, liquid-liquid extraction separation, etc. Diglycerol monoesters of fatty acids suitable for the present purpose can usually be obtained efficiently and economically by the molecular distillation method. However, the present invention is not limited to these methods.

The constituent fatty acids of the diglycerol monoesters of fatty acids to be used in the milk-constituent-containing beverage by the present invention are mainly comprised of myristic acid and/or palmitic acid, the total amount of which comprises 70 wt.% or more and preferably 90 wt.% or more of the constituent fatty acids. It is unfavorable for the total amount to be less than 70 wt.% since the effect of suppressing the germination of spores of and proliferation heat-resistant spore-forming bacteria will be inadequate in this case.

The monoester content of the ester mixture in the diglycerol monoesters of fatty acids used in the present invention is 70 wt% or more and preferably 80 wt% or more. It is unfavorable for the monoester content to be less than 70 wt% since the effect of suppressing the germination of spores of and proliferation heatresistant spore-forming bacteria will be inadequate in this case.

The diglycerol monoesters of fatty acids used in the present invention may be added directly to the milk-constituent-containing beverage or may be added by mixing in the water or milk-constituent that comprises the milk-constituent-containing beverage.

The added amount of the diglycerol monoesters of fatty acids used in the present invention is 0.01 to 1.0 wt.% or preferably 0.01 to 0.5 wt% to 1 part of milk-constituent-containing beverage. If the added amount is less than 0.01 wt.%, the effect of suppressing the germination of spores of and proliferation heat-resistant spore-forming bacteria will be inadequate, and if the added amount is greater than 1.0 wt.%, there will be an undesirable effect on the flavor.

The abovementioned component (B) used in the present invention shall be described next.

The citric acid esters of mono-and diglycerides of fatty acids, succinic acid esters of mono-and diglycerides of fatty acids, or diacetytartaric acid esters of mono-and diglycerides of fatty acids used in the present invention is a mixed ester of (a) glycerol, (b) fatty acids, and (c) citric acid, succinic acid, or diacetyl tartaric acid, and the fatty acid constituents of the ester are saturated and/or unsaturated fatty acids with 12 to 22 carbons.

The polyglycerin monoesters of fatty acids used in the present invention is an ester of polyglycerol and fatty acids, and is preferably an ester of polyglycerol with an average degree of polymerization of 3 or more and saturated and/or unsaturated fatty acids with 12 to 22 carbons. The polyglycerin monoester of fatty acids has an HLB of 3 to 16.

The sucrose esters of fatty acids to be used in the present invention is an esterification product of sucrose and fatty acids, and though the fatty acids thereof can be saturated and/or unsaturated fatty acids with 12 to 22 carbons, it is especially preferable for the fatty acids to be saturated fatty acids. The sucrose esters of fatty acids have an HLB of 3 to 16.

As component (B) of the present invention, one or more esters is selected from among a group comprised of citric acid esters of mono-and diglycerides of fatty acids, succinic acid esters of mono-and diglycerides of fatty acids, diacetyl-tartaric acid esters of mono-and diglycerides of fatty acids, polyglycerin monoester of fatty acids with an HLB of 3 to 16, and sucrose fatty acid esters with an HLB of 3 to 16. The total amount of component (B) added to the milk-constituent-containing beverage is 0.002 to 0.3 wt% and preferably 0.01 to 0.15 wt%. With an added amount of less than 0.002 wt%, the purported effects of preventing coagulation, oiling off, feathering, precipitation, etc. of milk constituents cannot be exhibited satisfactorily. An added amount of more than 0.3 wt% not only brings about an undesirable effect on the flavor and taste but is also uneconomical since the purported effects will not be improved.

By containing (A) diglycerol monoesters of fatty acids and (B) at least one emulsifier selected from a group comprised of citric acid esters of mono-and diglycerides of fatty acids, succinic acid esters of mono-and diglycerides of fatty acids, diacetyltartaric acid esters of fatty acids, polyglycerin monoesters of fatty acids with an HLB of 3 to 16, and sucrose esters of fatty acids with an HLB of 3 to 16, the milk-constituent-containing beverage of the present invention becomes a beverage with good storage properties in which the germination of spores of and proliferation heat-resistant spore-forming bacteria are suppressed, flat sour deterioration is prevented, coagulation, oiling off, feathering, precipitation, etc. of the milk constituents will not occur, and the flavor and taste will not be damaged even when the beyerage is stored under high temperature over long periods of time.

As long as the milk-constituent-containing beverage of the present invention contains the emulsifier (A) and the emulsifier (B) used in the present invention, emulsifiers besides those used in the invention may be used within quantiry ranges which will not damage the effects of the invention.

EXAMPLES

The milk-constituent-containing beverage of the present invention shall now be described by way of examples and comparison examples.

Examples 1–6 and Comparison Examples 1–12

4 kg of coffee bean extract, 0.8 kg of granulated sugar, 4 kg of raw milk were mixed to make a coffee-milk beverage. A total of 15 g of the emulsifiers shown in Table 1 where then added (milk fat content: 1.5%) to this coffee-milk beverage. After preliminary emulsification, the drink was homogenized at 150 kg/cm$^2$ with a piston homogenizer. Forty 250 ml of the coffee-milk beverage were then dispensed into each 40 test vessels. And 1 ml of a spore suspension (B. stearothermophilus, concentration: 1×10$^4$ spores/ml) was added to each test vessels. The test vessels were then heat sterilized for 1 minute at 121° C. and stored for 30 days at 55° C. The number of aliquots among the forty test vessels which had undergone deterioration or decomposition was then counted. The results are shown in Tables 1 and 2.

At the same time, oiling off, feathering, precipitation, and neck ring were observed for the coffee-milk beverage test vessels which had not undergone deterioration due to the heat-resistant spore-forming bacteria.

These results are also shown in Tables 1 and 2.

Examples 7–9 and Comparison Examples 13–20

7.6 kg of coffee bean extract, 600 g of granulated sugar, 960 ml of raw milk, 830 g of whole milk powder, and 10 g of sodium bicarbonate were mixed to make a coffee-milk drink. A total of 10 g of the emulsifiers shown in Table 2 where then added (milk fat content: 2.5%) to this coffee-milk drink. After preliminary emulsification, the drink was homogenized at 150 kg/cm$^2$ with a piston homogenizer. Forty 250 ml of the coffee-milkk beverage were then dispensed and 1 ml of a spore suspension (C. thermoaceticum, concentration: 1×10$^4$ spores/ml) was added to each test vessels. The test vessels were then heat sterilized for 20 minutes at 121° C. and stored for 30 days at 55° C. The number of test vessels among the forty test vessels which had undergone deterioration or decomposition was then counted. The results are shown in Tables 3 and 4.

At the same time, oiling off, feathering, precipitation, and neck ring were observed for the coffee-milk beverage test vessels which had not undergone deterioration due to the heat-resistant spore-forming bacteria.

These results are also shown in Tables 3 and 4.

TABLE 1

| Ex. No. | Types of emulsifier (See Note 2), Figures in the ( ) are the contents (wt. %). | | | Evaluation items (See Note 1) | | | | |
|---|---|---|---|---|---|---|---|---|
| | | | | A | B | C | D | E |
| 1 | A1(0.05) | B1(0.1) | — | 0 | ⊚ | ⊚ | ○⊚ | ⊚ |
| 2 | A1(0.05) | B1(0.07) | B2(0.03) | 0 | ⊚ | ⊚ | ○⊚ | ⊚ |
| 3 | A2(0.05) | B3(0.1) | — | 0 | ○⊚ | ⊚ | ○⊚ | ⊚ |
| 4 | A2(0.05) | B4(0.1) | — | 0 | ○⊚ | ○⊚ | ○⊚ | ○⊚ |
| 5 | A3(0.05) | B5(0.1) | — | 0 | ⊚ | ○ | ⊚ | ⊚ |
| 6 | A4(0.05) | B1(0.1) | — | 0 | ⊚ | ⊚ | ⊚ | ⊚ |

Note 1:
Evaluation items
A = number of test vessels among the 40 test vessels that underwent deterioration, B = feathering, C = oiling off, D = precipitation, and E = neck ring, the following evaluation standards were used. When two symbols are indicated, this means that the condition is intermediate those corresponding to the two symbols. ⊚ = Unobserved, ○ = Observed slightly, □ = Observed clearly but in small quantities, Δ = Observed in large quantities and X = Impossible to evaluate.
Note 2:
Types of emulsifier
A1 Diglycerol monoesters of fatty acids Constituent fatty acids: palmitic acid 99 wt. % Monoester content: 85 wt. %
A2 Diglycerol monoesters of fatty acids Constituent fatty acids: myristic acid 99 wt. % Monoester content: 80 wt. %
A3 Diglycerol monoesters of fatty acids Constituent fatty acids: myristic acid 99 wt. % Monoester content: 85 wt. %
A4 Diglycerol monoesters of fatty acids Constituent fatty acids: palmitic acid 55 wt. % myristic acid 45 wt. % Monoester content: 80 wt. %
B1 Diacetyltartaric acid esters of mono-and diglycerides of fatty acids (Used POEM W-10 made by Riken Vitamin Co.) Constituent fatty acids: stearic acid 70 wt. %, palmitic acid 30 wt. %
B2 Polyglycerin monoesters of fatty acids (Used POEM J-0381 made by Riken Vitamin Co.) Constituent fatty acids: oleic acid 80 wt. % HLB:12
B3 Succinic acid esters of mono-and diglycerides of fatty acids (Used POEM B-10 made by Riken Vitamin Co.) Constituent fatty acids: stearic acid 70 wt. %, palmitic acid 30 wt. %
B4 Citric acid esters of mono-and diglycerides of fatty acids (Used POEM K-30 made by Riken Vitamin Co.) Constituent fatty acids: stearic acid 70 wt. %, palmitic acid 30 wt. %
B5 Sucrose esters of fatty acids (Used RYOTO S-1570 made by Mitsubishi Chemical Corp.) Constituent fatty acids: stearic acid 70 wt. % HLB: 15

TABLE 2

| Comparison Ex. No. | Types of emulsifier (See Note 4, Figures in the ( ) are the contents (wt. %). | | | Evaluation items (See Note 3) | | | | |
|---|---|---|---|---|---|---|---|---|
| | | | | A | B | C | D | E |
| 1 | A1(0.05) | B'11(0.1) | — | 0 | Δ□ | ○ | □○ | □ |
| 2 | A1(0.05) | B'12(0.1) | — | 0 | □ | ○⊚ | □ | ○ |
| 3 | A1(0.05) | B'13(0.1) | — | 0 | □ | ○ | □ | □ |
| 4 | A'11(0.05) | B1(0.1) | — | 14 | ⊚ | ⊚ | ○⊚ | ⊚ |
| 5 | A'12(0.05) | B'13(0.03) | B'14(0.07) | 21 | Δ□ | □ | □○ | Δ |
| 6 | A'13(0.05) | B'11(0.1) | — | 10 | Δ□ | ○ | □ | Δ□ |
| 7 | A'14(0.05) | B'15(0.1) | — | 18 | Δ | Δ□ | Δ□ | Δ |
| 8 | A'15(0.05) | B1(0.1) | — | 40 | x | x | x | x |
| 9 | — | B1(0.1) | B'16(0.05) | 31 | ○⊚ | ○⊚ | ⊚ | ○ |
| 10 | — | B1(0.1) | B7(0.05) | 40 | x | x | x | x |
| 11 | — | B1(0.1) | B8(0.05) | 37 | ⊚ | ⊚ | ○ | ⊚ |
| 12 | — | B1(0.1) | B9(0.05) | 40 | x | x | x | x |

Note 3:
Evaluation items, see Note 1 of Table 1.
Note 4:
Types of emulsifier
A'11 Diglycerol monoesters of faty acids Constituent fatty acids: lauric acid 99 wt. % Monoester content: 90 wt. %
A'12 Diglycerol monoesters of faty acids Constituent fatty acids: oleic acid 99 wt. % Monoester content: 90 wt. %
A'13 Diglycerol monoesters of faty acids Constituent fatty acids: palmitic acid 55 wt. % stearic acid 45 wt. % Monoester content: 80 wt. %
A'14 Diglycerol monoesters of faty acids Constituent fatty acids: myristic acid 99 wt. % Monoester content: 40 wt. %
A'15 Diglycerol monoesters of faty acids Constituent fatty acids: palmitic acid 45 wt. % stearic acid 55 wt. % Monoester content: 35 wt. %
B6 Citric acid esters of mono-and diglycerides of fatty acids Constituent fatty acids: stearic acid 70 wt. %, palmitic acid 30 wt. %
B'11 Lecithin (Used DX lecithin made by Nisshin Seiu Co.)
B'12 Sorbitan esters of fatty acids (Used POEM S300B made by Riken Vitamin Co., Ltd.) Constituent fatty acids: stearic acid 70 wt. %, palmitic acid 30 wt. %
B'13 Mono-and diglycerides of fatty acids (Used EMULSEE-MS made by Riken Vitamin Co., Ltd.) Constituent fatty acids: stearic acid 70 wt. %, palmitic acid 30 wt. %
B'14 Polyglycerin monoesters of fatty acids (Used POEM J-0080 made by Riken Vitamin Co., Ltd.) Constituent fatty acids: stearic acid 70 wt. %, palmitic acid 30 wt. %
B'15 Polyglycerol esters of polycondensed ricinoleic acid. (Used POEM PR-300 made by Riken Vitamin Co., Ltd.) HLB: 0.3
B'16 Polyglycerin monoesters of fatty acids (Used POEM J-0021 made by Riken Vitamin Co., Ltd.) Constituent fatty acids: lauric acid 99 wt. % HLB: 15
B7 Polyglycerin monoesters of fatty acids (Used POEM J-0041 made by Riken Vitamin Co., Ltd.) Constituent fatty acids: myristic acid 99 wt. % HLB: 15
B8 Sucrose esters of fatty acids (Used RYOTO P-1670 made by Mitsubishi Chemical Corp.) Constituent fatty acids: palmitic acid 80 wt. % HLB 16

TABLE 3

| Ex. No. | Types of emulsifier (See Note 6), Figures in the ( ) are the contents (wt. %). | | | Evaluation items (See Note 5) | | | | |
|---|---|---|---|---|---|---|---|---|
| | | | | A | B | C | D | E |
| 7 | A2(0.005) | B1(0.05) | — | 0 | ○⊚ | ⊚ | ○⊚ | ⊚ |
| 8 | A2(0.005) | B1(0.035) | B2(0.015) | 0 | ⊚ | ⊚ | ⊚ | ⊚ |
| 9 | A1(0.05) | B4(0.05) | | 0 | ⊚ | ⊚ | ○⊚ | ⊚ |

Note 5:
Evaluation items, see Note 1 of Table 1.
Note 6:
Types of emulsifier, see Note 2 of Table 1.

TABLE 4

| Comparison Ex. No. | Types of emulsifier (See Note 4, Figures in the ( ) are the contents (wt. %). | | | Evaluation items (See Note 3) | | | | |
|---|---|---|---|---|---|---|---|---|
| | | | | A | B | C | D | E |
| 13 | A1(0.05) | B'21(0.05) | — | 0 | □ | ○□○ | Δ□ | |
| 14 | A1(0.05) | B1(0.035) | B'22(0.015) | 0 | Δ□ | □○ | □ | Δ |
| 15 | A'16(0.05) | B1(0.05) | — | 16 | ○⊚ | ⊚○⊚ | ○⊚ | |
| 16 | A'17(0.05) | B'23(0.05) | — | 9 | Δ□ | □ | □ | Δ |
| 17 | A'18(0.05) | B'24(0.05) | — | 25 | Δ | Δ | x | Δ |
| 18 | — | B1(0.05) | B7(0.05) | 30 | ○ | ⊚ | ○ | ○ |

TABLE 4-continued

| Compa- rison Ex. No. | Types of emulsifier (See Note 4), Figures in the ( ) are the contents (wt. %). | | A | B | C | D | E |
|---|---|---|---|---|---|---|---|
| 19 | — | B1(0.05) BB9 (0.05) | 5 | ⊙ | ⊙⊙ | ⊙ | ⊙ |
| 20 | A1(0.05) | B'25(0.05) — | 0 | Δ | Δ□ | Δ | Δ |

Note 7:
Evaluation items, see Note 1 of Table 1.
Note 8:
Types of emulsifier
A'16 Diglycerol monoesters of fatty acids Constituent fatty acids: lauric acid 99 wt. % Monoester content: 90 wt. %
A'17 Diglycerol monoesters of fatty acids Constituent fatty acids: palmitic acid 55 wt. % stearic acid 45 wt. % Monoester content: 70 wt. %
A'18 Diglycerol monoesters of fatty acids Constituent fatty acids: myristic acid 99 wt. % Monoester content: 40 wt. %
B'21 Lecithin (Used DX Lecithin made by Nisshin Seiu Co.)
B'22 Mono-and diglycerides of fatty acids (Used EMULSEE-HRO made by Riken Vitamin Co., Ltd.) Constituent fatty acids: oleic acid 75 wt. %
B'23 Lecithin (Used Lecithin PK made by Riken Vitamin Co.)
B'24 Sucrose esters of fatty acids (Used RYOTO ER-290 made by Mitsubishi Chemical Corp.) Constituent fatty acids: erucic acid 90 wt. %
B'25 Propylen glycol esters of fatty acids (Used RIKEMUL PS-100 made by Riken Vitamin Co.) Constituent fatty acids: stearic acid 70 wt. %, palmitic acid 30 wt. %
B9 Sucrose esters of fatty acids (Used RYOTO P-1670 made by Mitsubishi Chemical Corp.) Constituent fatty acids: palmitic acid 80 wt. % HBL: 16

As the above, with the milk-constituent-containing beverage by the present invention, since the germination of spores of and proliferation heat-resistant spore-forming bacteria are suppressed, flat sour deterioration is prevented, and problems such as coagulation, oiling off, feathering, precipitation, neck ring, etc. of the milk constituents do not occur, the problems mentioned above are solved even for cases where the beverage is stored under heated conditions in a vending machine, etc.

What is claimed is:

1. A milk-constituent-containing beverage, comprising:
   (A) a composition containing at least 70 wt % of diglycerol monoesters of fatty acids, with at least 70 wt % of said diglycerol monoesters of fatty acids being diglycerol monoesters of fatty acids selected from the group consisting of myristic acid, palmitic acid and mixtures thereof; and
   (B) at least one emulsifier selected from the group consisting of citric acid esters of mono- and diglycerides of fatty acids, suceinic acid esters of mono- and diglycerides of fatty acids, diacetyltartaric acid esters of mono- and diglycerides of fatty acids, polyglycerin monoesters of fatty acids with an HLB of 3 to 16, and sucrose esters of fatty acids with an HLB of 3 to 16.

2. A milk-constituent-containing beverage resistant to heat-resistant, spore-forming bacteria and is resistant to coagulation, oiling off, feathering, precipitation, neck ring of the milk constituents, said milk constituent-containing beverage comprising:
   (A) a composition including at least 70 wt % of diglycerol monoesters of fatty acids with at least 70 wt % of said diglycerol monoesters of fatty acids being diglycerol monoesters of fatty acids selected from the group consisting of myristic acid, palmitic acid and mixtures thereof; and
   (B) at least one emulsifier selected from the group consisting of citric acid esters of mono- and diglycerides of fatty acids, Euccinic acid esters of moono- and diglycerides of fatty acids, diacetyltartaric acid esters of mono- and diglycerides of fatty acids, polyglycerin monoesters of fatty acids with an ILB of 3 to 16, and sucrose esters of fatty acids with an RLB of 3 to 16.

3. The milk-constituent-containing beverage of claim 2 wherein said composition is included in an amount sufficient to inhibit growth of heat resistant spore-forming bacteria.

4. The milk-constituent-containing beverage of claim 2, wherein said beverage comprises about 0.01 wt % to 1.0 wt % of said composition of said diglycerol monoesters of fatty acids.

5. The milk-constituent-containing beverage of claim 2, comprising about 0.002 wt % to 0.3 wt % of said at least one emulsifier.

6. The milk-constituent-containing beverage of claim 2, wherein said polyglycerin monoesters are esters of a polyglycerol having an average degree of polymerization of at least three and a saturated or unsaturated fatty acid having 12 to 22 carbon atoms.

7. The milk-constituent-containing beverage of claim 2, wherein said composition comprises at least 80 wt % of said diglycerol monoester of fatty acids.

8. The milk-conEtituent-containing beverage of claim 6, wherein said diglycerol monoesters of said composition comprise at least 90 wt % of diglycerol monoeeters of fatty acids selected from the group consisting of myristic acid, palmitic acid, and mixtures thereof.

9. A milk-containing beverage, comprising:
   a composition containing at least 70 wt % of diglycerol esters of fatty acids with at least 70 wt % of said diglycerol esters of fatty acids being diglycerol monoesters of fatty acids selected from the group consisting of myristic acid, palmitic acid and mixtures thereof, said composition being present in an amount sufficient to inhibit growth of heat-resistant spore-forming bacteria.

10. The beverage of claim 9, comprising about 0.01 wt % to about 1.0 wt % of said composition.

11. The beverage of claim 9, further comprising an emulsifier.

12. The beverage of claim 11, wherein said emulsifier is selected from the group consisting of citric acid esters of mono- and diglycerides of fatty acids, succinic acid esters of mono- and diglycerides of fatty acids, diacetyltartaric acid esters of mono- and diglycerides of fatty acids and mixtures thereof.

13. The milk-containing beverage of claim 12, comprising about 0.002 wt % to about 0.3 wt % of said emulsifier.

14. A method of inhibiting growth of a heat-resistant, spore-forming bacteria and inhibiting coagulation, oiling off, feathering, precipitation, neck ring of a milk-containing beverage, comprising the steps of
   combining a composition with said beverage, said composition including at least 70 wt % of diglycerol monoesters of fatty acids with at least 70 wt % of said diglycerol monoesters of fatty acids are diglycerol monoesters of fatty acids being selected from the group consisting of myristic acid, palmitic acid and mixtures thereof, and
   admixing at least one emulsifier with said beverage, said emlsifier being selected from the group consisting of citric acid esters of mono- and diglycerides of fatty acids, succinic acid esters of mono- and diglycerides of fatty acids, diacetyltartaric acid esters of mono- and diglycerides of fatty acids, polyglycerin monoesters of fatty acids with an HLB of 3 to 16, and sucrose esters of fatty acids with an HLB 3 to 16.

15. The method of claim 14, further comprising admixing about 0.01 wt % to 1.0 wt % of said composition with said beverage.

16. The method of claim 14, further comprising admixing about 0.002 wt % to 0.3 wt % of said at least one emulsifier with said beverage.

* * * * *